US009440227B2

(12) United States Patent
Zhang et al.

(10) Patent No.: US 9,440,227 B2

(45) Date of Patent: Sep. 13, 2016

(54) METHOD FOR PREPARING CATALYST COATING ON METAL BASE PLATE

(75) Inventors: Zhongtao Zhang, Dongcheng (CN); Yi Cheng, Haidian (CN); Xuli Zhai, Haidian (CN); Yong Jin, Dongcheng (CN); Jianzhong Li, Haidian (CN); Guizhi Wang, Dongcheng (CN); Zhixiang Zhang, Dongcheng (CN); Huimin Yuan, Dongcheng (CN); Fengrong Wang, Dongcheng (CN); Xianming Xu, Dongcheng (CN); Shubao Wan, Dongcheng (CN); Fangwei Li, Dongcheng (CN); Fengbo Ma, Dongcheng (CN); Jing Wei, Dongcheng (CN); Jina Zhao, Dongcheng (CN); Lijun Liu, Dongcheng (CN); Dawei Zhang, Dongcheng (CN)

(73) Assignees: Petrochina Company Limited, Beijing (CN); Tsinghua University, Beijing (CN)

( * ) Notice: Subject to any disclaimer, the term of this patent is extended or adjusted under 35 U.S.C. 154(b) by 428 days.

(21) Appl. No.: 13/814,645

(22) PCT Filed: Nov. 28, 2011

(86) PCT No.: PCT/CN2011/001976

§ 371 (c)(1), (2), (4) Date: Feb. 6, 2013

(87) PCT Pub. No.: WO2012/075675

PCT Pub. Date: Jun. 14, 2012

(65) Prior Publication Data

US 2013/0137569 A1 May 30, 2013

(30) Foreign Application Priority Data

Dec. 10, 2010 (CN) ......................... 2010 1 0597068

(51) Int. Cl.

*B01J 37/08* (2006.01)
*B01J 23/755* (2006.01)

(Continued)

(52) U.S. Cl.

CPC ................ *B01J 37/08* (2013.01); *B01J 21/04* (2013.01); *B01J 23/464* (2013.01); *B01J 23/755* (2013.01);

(Continued)

(58) Field of Classification Search

CPC .. B01J 37/08; B01J 37/0217; B01J 37/0225; B01J 37/0045; B01J 37/349; B01J 37/023; B01J 23/464; B01J 23/755; B01J 35/0013; B01J 21/04; C01B 3/40; C01B 2203/1064; C01B 2203/1082; C01B 2203/0233; C01B 2203/1241

USPC ............. 502/300–355; 427/180, 318, 372.2, 427/380; 977/773, 776

See application file for complete search history.

(56) References Cited

U.S. PATENT DOCUMENTS 5,721,188 A * 2/1998 Sung et al. .................. 502/439
6,884,516 B2 4/2005 Harada (Continued)

FOREIGN PATENT DOCUMENTS

CN 1436586 A 8/2003
CN 101280405 A 10/2008

(Continued)

*Primary Examiner* — Anthony J Zimmer

(74) *Attorney, Agent, or Firm* — Benjamin Aaron Adler

(57) ABSTRACT

A method for preparing catalyst coating on a metal base plate comprising: thermal-spraying a layer of α-aluminum oxide nano-particles on a metal base plate using a high temperature flame powder spray gun, at a temperature of 2500-3500° C. and a pressure of 0.2-1.2 MPa; coating an aluminum sol, the weight concentration of the aluminum sol aqueous solution being 2-30%, at a pH of 0.5-4, the drying temperature being 50-150° C., the drying time being 0.5-24 hours, the calcination temperature being 200-1200° C., and the calcination time being 0.5-24 hours; immersing in an active component, the immersing temperature being 20-120° C., the duration being 0.5-24 hours, the drying temperature being 50-150° C., the drying time being 0.5-24 hours, the calcination temperature being 200-1200° C., and the calcination time being 0.5-24 hours. The method is suitable for the preparation of various catalyst coatings with active components.

10 Claims, 2 Drawing Sheets

Ceramic

Metal

(51) Int. Cl.

| | |
|---|---|
| ***B01J 37/02*** | (2006.01) |
| ***B01J 37/34*** | (2006.01) |
| ***B01J 21/04*** | (2006.01) |
| ***B01J 23/46*** | (2006.01) |
| ***B01J 35/00*** | (2006.01) |
| ***B01J 37/00*** | (2006.01) |
| ***C01B 3/40*** | (2006.01) |

(52) U.S. Cl.

CPC ......... *B01J 35/0013* (2013.01); *B01J 37/0045* (2013.01); *B01J 37/0217* (2013.01); *B01J 37/0225* (2013.01); *B01J 37/349* (2013.01); *C01B 3/40* (2013.01); *B01J 37/023* (2013.01); *C01B 2203/0233* (2013.01); *C01B 2203/1058* (2013.01); *C01B 2203/1064* (2013.01); *C01B 2203/1082* (2013.01); *C01B 2203/1241* (2013.01)

(56) References Cited

U.S. PATENT DOCUMENTS

| | | | | |
|---|---|---|---|---|
| 2004/0065391 | A1* | 4/2004 | Smith et al. .................. | 148/512 |
| 2005/0282703 | A1* | 12/2005 | Sevener et al. ............... | 502/324 |

FOREIGN PATENT DOCUMENTS

| | | | | |
|---|---|---|---|---|
| CN | 102139215 | A | * | 8/2011 |
| CN | 1863598 | A | | 11/2011 |
| EP | 915184 | A1 | * | 5/1999 |
| JP | 62241552 | A | | 10/1987 |
| JP | 08035658 | A | * | 2/1996 |
| JP | 2010285651 | A | * | 12/2010 |

* cited by examiner

METHOD FOR PREPARING CATALYST COATING ON METAL BASE PLATE

CROSS-REFERENCE TO RELATED APPLICATIONS

This US national stage application claims benefit of priority under 35 U.S.C. 371 of pending international application PCT/CN2011/001976, filed Nov. 28, 2011, which international application claims benefit of priority under 35 USC 119(a) of pending Chinese Patent Application No. 201010597068.4, filed Dec. 10, 2010, the entirety of both of which are hereby incorporated by reference.

BACKGROUND OF THE PRESENT INVENTION

Field of the Present Invention

The present invention relates to a method for preparing a catalyst coating on a metal substrate.

In recent years, as a newly emerging technology, microreactors have received more and more recognition. Companies such as DuPont, BASF, Bayer, Degussa etc. have been making effort to promote and facilitate the development of microreactors. A microreactor refers to a reactor in which the size of a fluid flowing channel in one dimension of the three dimensions is tens of microns to several millimeters. Due to the reduction in physical size, gradients of some physical parameters (such as temperature gradient, pressure gradient, and concentration gradient and the like) are significantly increased, thereby greatly improving the mass transfer efficiency and heat transfer efficiency in the reactor. Besides the improvement in the transfer performance brought by the confinement in space, microreactors can also be operated in parallel as independent units. Therefore, the processing capability of the microreactor can be improved by increasing the number of the microreactors, and enlargement of production scale can be achieved through amplification of the number. Unlike the conventional reactor, microreactors do not need to progressively enlarge the reaction apparatus to achieve the enlargement of production scale, so that the industrialization and large-scale production can be achieved at a low cost, and the distributed production can be performed.

Due to the requirements of operation of microreactors, it is generally necessary for a catalyst to be adhered to the wall of the reactor to form a catalyst film. There are a number of methods for depositing the catalyst on the surface of the metal substrate, including suspension deposition, sol-gel deposition, electrophoretic deposition and electroplating deposition. Due to the large difference in coefficient of thermal expansion between the metal and the catalyst, the catalyst layer deposited on the surface of the metal substrate is eroded and falls off during long-time high-temperature operation and repeated heating and cooling process. Despite numerous researches done in the field of catalyst deposition on the metal substrate at home and abroad, the problem of falling off of the catalyst layer has not been solved, which limits the industrial application and development of high-temperature microreactors.

SUMMARY OF THE PRESENT INVENTION

The present invention is directed to providing a method for preparing a catalyst coating on a metal substrate, wherein the catalyst coating does not fall off at high temperatures and has good catalytic performance.

The method for preparing a catalyst coating on a metal substrate according to the present invention is implemented by the following technical solution. First, a layer of α-alumina nanoparticles is thermally sprayed onto a metal substrate to produce a composite substrate. Then, an alumina sol is coated, dried and calcinated to form α-alumina, which provides a large specific surface area. Finally, active components are immersed, dried and calcinated to obtain a catalyst coating. The present invention is applicable to preparation of the catalyst coating having various active components.

The method for preparing a catalyst coating on a metal substrate according to the present invention is as follows. A metal substrate is pre-heated to a temperature around the melting point using an oxyacetylene flame powder spray gun, wherein the flame temperature is 2500° C. to 3500° C., preferably 2800° C. to 3200° C., and the pressure is 0.2 to 1.2 MPa, and preferably 0.5 to 0.9 MPa. α-alumina nanoparticles are sprayed onto the surface of the metal substrate, and the thickness of the alumina layer may be adjusted as desired. Compared with previous coating methods which merely heating the alumina particles, the method of heating the metal substrate at the same time allows a part of the alumina particles to be embedded into the metal bulk phase, thereby facilitating the bonding of the alumina particles and the metal substrate. FIG. 1 shows a schematic view of the composite substrate.

In the method for preparing a catalyst coating on a metal substrate of the present invention, the preparation of the alumina sol involves formulating an aqueous solution of pseudo boehmite having a weight concentration of 2% to 30%, preferably 5% to 20%, adjusting the pH value to 0.5 to 4, preferably 2 to 3; and heating at 40° C. to 95° C., preferably 60° C. to 85° C. under stirring for 0.5 to 24 hrs, preferably 4 to 12 hrs.

In the method for preparing a catalyst coating on a metal substrate of the present invention, the step of coating the alumina sol involves lifting up the composite substrate previously obtained at a constant speed of 3 cm/min after being immersed in the alumina sol for 3 min, and drying at room temperature.

In the method for preparing a catalyst coating on a metal substrate of the present invention, the drying temperature of the alumina sol is 50° C. to 150° C., preferably 80° C. to 120° C., the drying time is 0.5 to 24 hrs, preferably 4 to 12 hrs, the calcination temperature is 200° C. to 1200° C., preferably 400° C. to 800° C., and the calcination time is 0.5 to 24 hrs, preferably 4 to 12 hrs.

In the method for preparing a catalyst coating on a metal substrate of the present invention, the temperature for immersing in the active components is 20° C. to 120° C., preferably 60° C. to 85° C., and the time for immersing in the active components is 0.5 to 24 hrs, preferably 4 to 12 hrs.

In the method for preparing a catalyst coating on a metal substrate of the present invention, after the immersion of the active components, the drying temperature is 50° C. to 150° C., preferably 80° C. to 120° C., the drying time is 0.5 to 24 hrs, preferably 4 to 12 hrs, the calcination temperature is 200° C. to 1200° C., preferably 400° C. to 800° C., and the calculation time is 0.5 to 24 hrs, and preferably 4 to 12 hrs.

DETAILED DESCRIPTION OF THE PRESENT INVENTION

Figure 1:
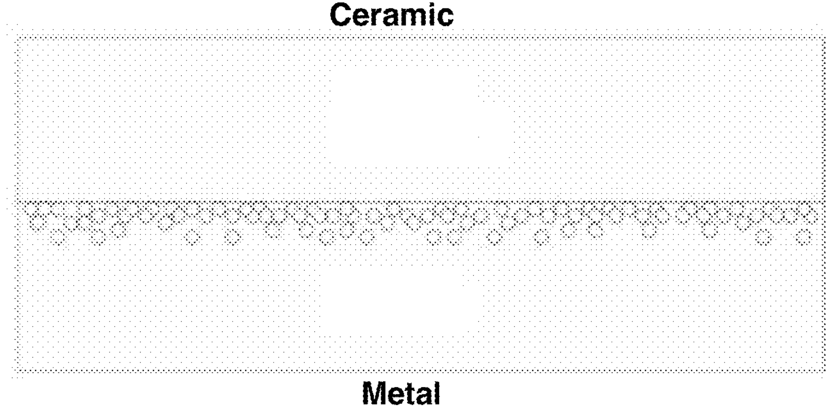
FIG. 1 is a schematic view of a composite substrate.

The present invention is further described in detail with the preparation of a Ni-based catalyst coating and a Rh-based catalyst coating for methane steam reforming reaction on a metal substrate (FeCrAl substrate) as an example.

Example 1

First, a metal substrate was placed into a thermal spray device and heated to 1200° C., and α-alumina nanoparticles were put into the spray gun hopper. The flame temperature was 2500° C. to 3500° C., and the pressure was 0.2 to 1.2 MPa. The nanoparticles were sprayed onto the surface of the metal substrate to obtain a composite substrate. An aqueous solution of 10% pseudo boehmite was then formulated, and the pH value was adjusted to 2 with 5 mol/L nitric acid. The solution was heated at 80° C. with stirring for 5 hrs to produce an alumina sol. The substrate was immersed in the alumina sol for 3 min, and then was lifted up at a constant speed of 3 cm/min. The substrate was dried at room temperature, and then dried at 110° C. for 0.5 hr, and calcinated at 600° C. for 6 hrs. An aqueous solution of 50% nickel nitrate was formulated and heated to 80° C. The previously obtained substrate was immersed in the solution and kept for 6 hrs. The substrate was removed, dried and aged at 110° C. for 6 hrs, and finally calcinated at 600° C. for 6 hrs to produce the nickel-based catalyst coating for methane steam reforming reaction.

Example 2

First, a metal substrate was placed into a thermal spray device and heated to 1200° C., and α-alumina nanoparticles were put into the spray gun hopper. The flame temperature was 2800° C. to 3200° C., the pressure was 0.5 to 0.9 MPa. The nanoparticles were sprayed onto the surface of the metal substrate to obtain a composite substrate. An aqueous solution of 10% pseudo boehmite was then formulated, and the pH value was adjusted to 2 with 5 mol/L nitric acid. The solution was heated at 80° C. with stirring for 5 hrs to produce an alumina sol. The substrate was immersed in the alumina sol for 3 min, and then was lifted up at a constant speed of 3 cm/min. The substrate was dried at room temperature, and then dried at 110° C. for 0.5 hr, and calcinated at 600° C. for 6 hrs. An aqueous solution of 25% nickel nitrate was formulated and heated to 80° C. The previously obtained substrate was immersed in the solution and kept for 6 hrs. The substrate was removed, dried and aged at 110° C. for 6 hrs, and finally calcinated at 600° C. for 6 hrs to produce a nickel-based catalyst coating for methane steam reforming reaction.

Example 3

First, a metal substrate was placed into a thermal spray device and heated to 1200° C., and α-alumina nanoparticles were put into the spray gun hopper. The flame temperature was 2500° C. to 3500° C., the pressure was 0.5 to 0.9 MPa. The nanoparticles were sprayed onto the surface of the metal substrate to obtain a composite substrate. An aqueous solution of 10% pseudo boehmite was then formulated, and the pH value was adjusted to 2 with 5 mol/L nitric acid. The solution was heated at 80° C. with stirring for 25 hrs to produce an alumina sol. The substrate was immersed in the alumina sol for 3 min, and then was lifted up at a constant speed of 3 cm/min. The substrate was dried at room temperature, and then dried at 110° C. for 0.5 hr, and calcinated at 600° C. for 6 hrs. An aqueous solution of rhodium chloride having a suitable concentration was formulated and heated to 80° C. The previously obtained substrate was immersed in the solution and kept for 6 hrs. The substrate was removed, dried and aged at 110° C. for 6 hrs, and finally calcinated at 600° C. for 6 hrs to produce a rhodium-based catalyst coating for methane steam reforming reaction.

INDUSTRIAL APPLICABILITY

Figure 2:
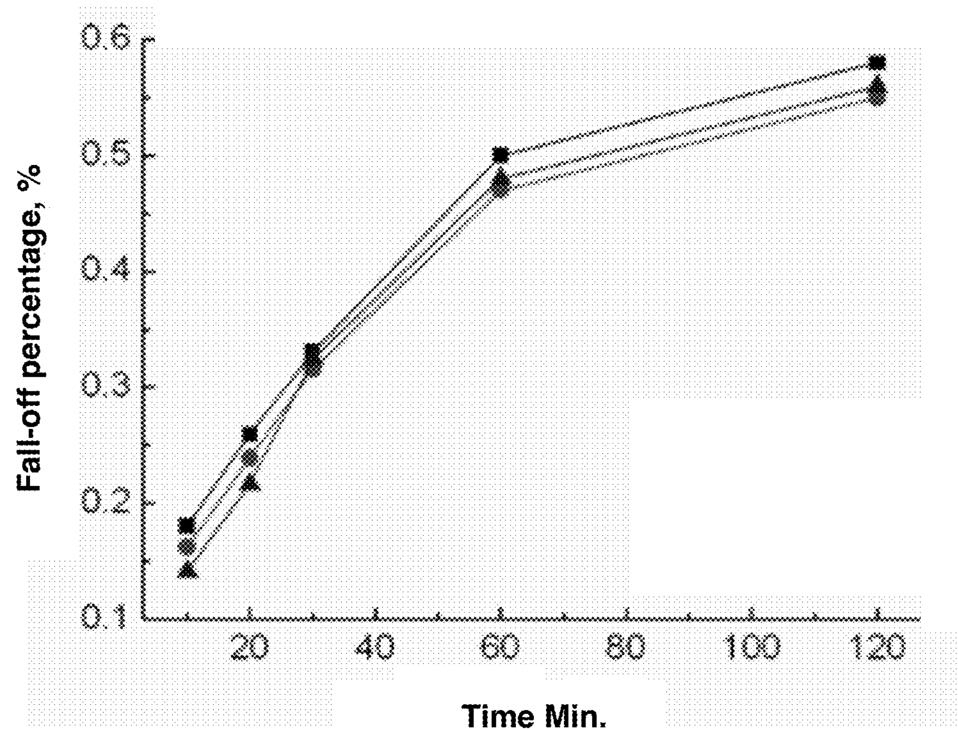
FIG. 2 is an ultrasonic vibration fall-off rate data of a Ni-based catalyst coating before a reaction.
Figure 3:
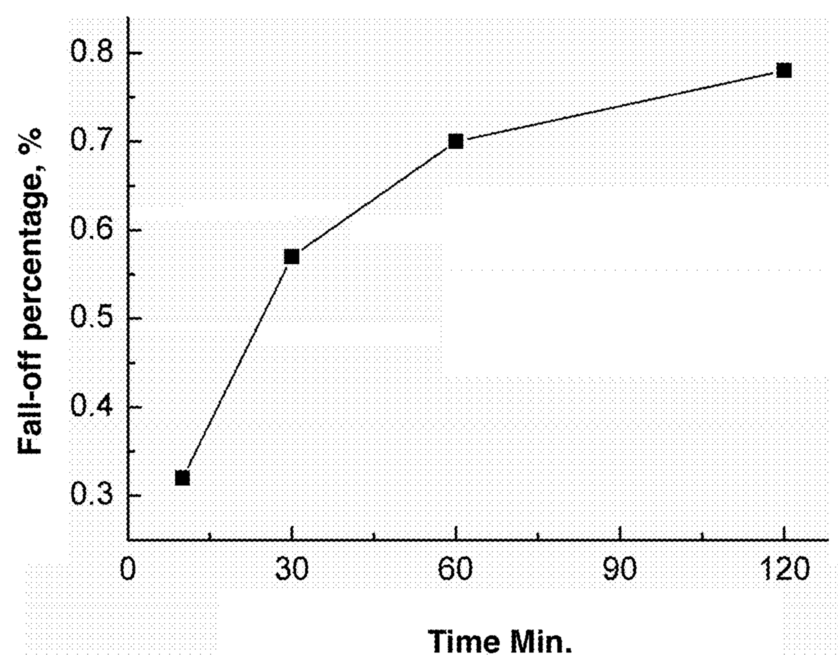
FIG. 3 is an ultrasonic vibration fall-off rate data of a Ni-based catalyst coating after a reaction.

The Ni-based and Rh-based catalyst coatings for a methane steam reforming reaction as described in the examples were subjected to an ultrasonic vibration fall-off rate test. The test conditions were: 45 KHz and 200 W. The results of the fall-off rate test are shown in FIG. 2. It can be seen from FIG. 2 that the fall-off rate is below 0.6% and tends to be stabilized. Compared with the results reported in the documents, the fall-off rate is improved by an order of magnitude. After 20-hr methane steam reforming experiment (900° C.), the results of the fall-off rate test for the catalyst coatings are shown in FIG. 3. It can be seen from FIG. 3 that after a long-time high-temperature reaction, the fall-off rate is lower than 0.8% and tends to be stabilized, similar to that before the reaction, indicating that the obtained catalyst coatings can completely meet the requirements of high-temperature operation.

In the thermal spray step of the present invention, the metal substrate is heated while the alumina particles are heated, so that the alumina particles can be partially embedded within the metal substrate, thereby greatly enhancing the degree of bonding between the alumina particles and the substrate. In addition, the α-alumina layer providing the large specific surface area for the active components is obtained via the calcination of the alumina sol, thereby eliminating the step of re-coating the α-alumina sol and greatly reducing the possibility of falling off of the catalyst coating.

What is claimed is:

1. A method for preparing a catalyst coating on a metal substrate, comprising:

a) pre-heating the metal substrate to a temperature about the melting point of the metal substrate;

b) thermally spraying a layer of α-alumina nanoparticles onto the pre-heated metal substrate to produce a composite substrate;

c) coating the composite substrate with an alumina sol;

d) drying and calcinating the alumina sol-coated composite substrate to form an α-alumina coated composite substrate;

e) immersing the α-alumina coated composite substrate into a solution of active components to form a coating of the active components thereon; and f) drying and calcinating the active components onto the α-alumina coated composite substrate to obtain the catalyst coating.

2. The method for preparing a catalyst coating on a metal substrate according to claim 1, wherein the layer of α-alumina nanoparticles is thermally sprayed onto the metal substrate at a flame temperature of 2500° C. to 3500° C., and a pressure of 0.2 to 1.2 MPa.

3. The method for preparing a catalyst coating on a metal substrate according to claim 1, wherein the alumina sol is prepared by heating an aqueous solution of pseudo boehmite at a weight concentration of 2% to 30% in the solution and a pH value of 0.5 to 4 at 40° C. to 95° C. with stirring for 0.5 hrs to 24 hrs.

4. The method for preparing a catalyst coating on a metal substrate according to claim 1, wherein the coating step c) comprises:

keeping the composite substrate immersed in the alumina sol for 3 min;

lifting the immersed composite substrate from the alumina sol at a constant speed of 3 cm/min; and drying the alumina sol-coated composite substrate at room temperature.

5. The method for preparing a catalyst coating on a metal substrate according to claim 1, wherein in step d) a drying temperature of the alumina sol is 50° C. to 150° C., a drying time is 0.5 to 24 hrs, a calcination temperature is 200° C. to 1200° C., and the calcination time is 0.5 to 24 hrs.

6. The method for preparing a catalyst coating on a metal substrate according to claim 1, wherein a temperature for immersing in the active components is 60° C. to 85° C., and the time for immersing in the active components is 4 to 12 hrs.

7. The method for preparing a catalyst coating on a metal substrate according to claim 1, wherein after immersing in the active components, the drying temperature is 50° C. to 150° C., the drying time is 0.5 to 24 hrs, the calcination temperature is 200° C. to 1200° C., and the calcination time is 0.5 to 24 hrs.

8. A method for preparing a catalyst coating on a metal substrate, comprising:

a) pre-heating the metal substrate to about its melting point;

b) thermally spraying a layer of α-alumina nanoparticles onto the pre-heated metal substrate at a flame temperature of 2800° C. to 3200° C., and a pressure of 0.5 MPa to 0.9 MPa to produce a composite substrate;

c) coating the composite substrate with an alumina sol, said alumina sol prepared by heating an aqueous solution of pseudo boehmite at a weight concentration of 2% to 30% in the solution and a pH value of 0.5 to 4 at 40° C. to 95° C. with stirring for 0.5 to 24 hrs;

d) drying and calcinating the alumina sol-coated composite substrate to form an α-alumina coated composite substrate, wherein a drying temperature is 80° C. to 120° C., a drying time is 4 hrs to 12 hrs, a calcination temperature is 400° C. to 800° C., and a calcination time is 4 hrs to 12 hrs;

e) immersing the α-alumina coated composite substrate into a solution of active components to form a coating of the active components thereon; wherein an immersion temperature is 60° C. to 85° C. and an immersion time is 4 hrs to 12 hrs; and f) drying and calcinating the active components onto the α-alumina coated composite substrate to obtain the catalyst coating, wherein a drying temperature is 80° C. to 120° C., a drying time is 4 hrs to 12 hrs, a calcination temperature is 400° C. to 800° C., and a calcination time is 4 hrs to 12 hrs.

9. The method for preparing a catalyst coating on a metal substrate according to claim 8, wherein the weight concentration of pseudo boehmite in the aqueous solution is 5% to 20% and the pH value is 2 to 3 at 60° C. to 85° C. with stirring for 4 to 12 hrs.

10. The method for preparing a catalyst coating on a metal substrate according to claim 8, wherein the coating step c) comprises:

keeping the composite substrate immersed in the alumina sol for 3 min;

lifting the immersed the composite substrate from the alumina sol at a constant speed of 3 cm/min; and drying the alumina sol-coated composite substrate at room temperature.

* * * * *